July 2, 1929.　　　K. HENRICHSEN　　　1,718,956
AEROPLANE LANDING GEAR
Filed July 21, 1927　　2 Sheets-Sheet 1

INVENTOR.
KNUT HENRICHSEN.
BY
ATTORNEYS.

July 2, 1929.　　　K. HENRICHSEN　　　1,718,956
AEROPLANE LANDING GEAR
Filed July 21, 1927　　　2 Sheets-Sheet 2
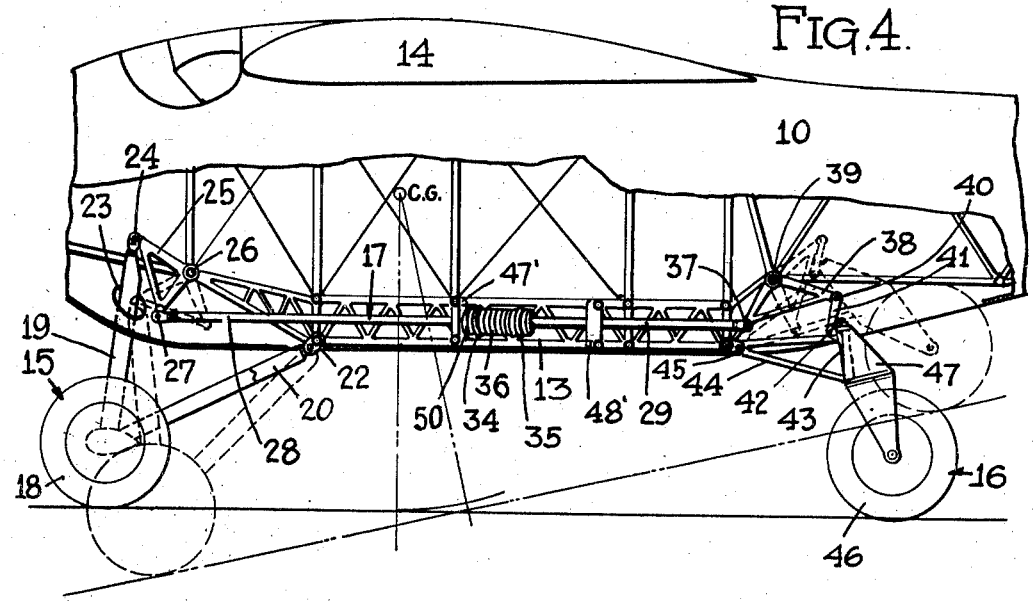
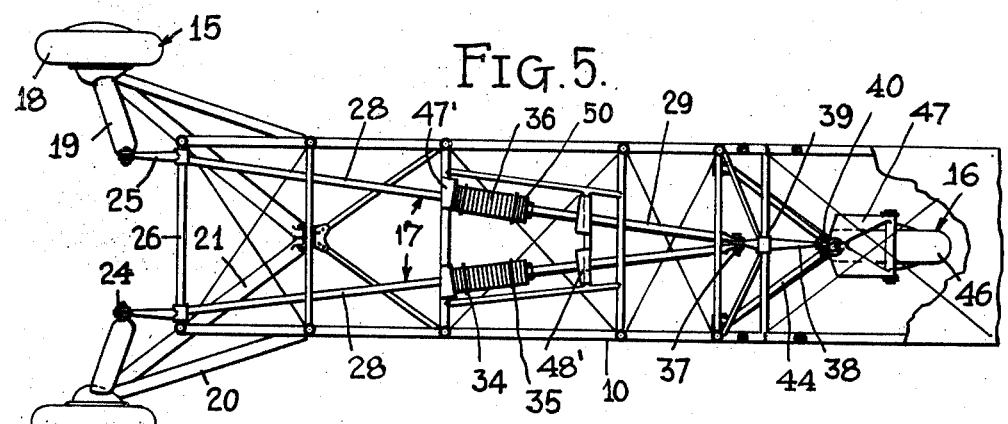
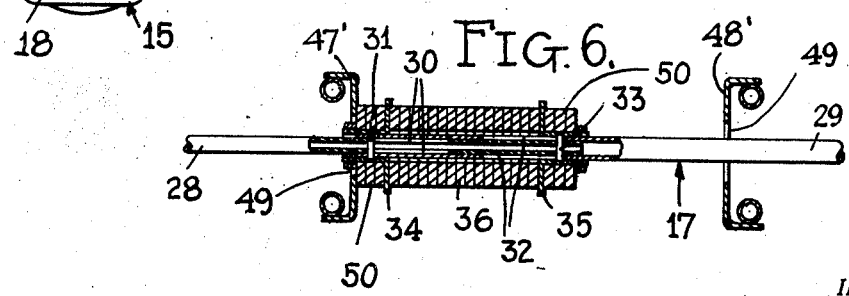
INVENTOR.
KNUT HENRICHSEN.
BY
ATTORNEYS.

Patented July 2, 1929.

1,718,956

UNITED STATES PATENT OFFICE.

KNUT HENRICHSEN, OF GARDEN CITY, NEW YORK, ASSIGNOR TO CURTISS AEROPLANE & MOTOR COMPANY, INC., A CORPORATION OF NEW YORK.

AEROPLANE LANDING GEAR.

Application filed July 21, 1927. Serial No. 207,375.

My invention relates to aeroplane landing gears.

An object of the invention is to provide an aeroplane landing gear having at least two, but preferably three, points of support, said points of support being disposed respectively (where three are provided), two in advance of and one to the rear of the transverse vertical plane of the center of gravity of the aeroplane, the forward point or points of support being disposed further in advance of, and the rear point of support being disposed nearer to said plane than is the conventional practice where two forward wheels and a tail skid are provided.

A further object of the invention is to provide an aeroplane landing gear in which both the front and the rear landing devices are interconnected for opposite simultaneous vertical movement under certain operating conditions and in which, under other and different operating conditions, either or both said landing devices may yield either independently or together; a shock absorber common to both said landing devices, being so related to said connection as to adequately and completely absorb all landing or ground operating shocks.

A further object of the invention is to provide an aeroplane landing gear in which the front or forward landing device or devices is or are heavier than the rear landing device, such difference in weight, plus the interconnection therebetween, being instrumental in causing the rear or lighter landing device to occupy, when the aeroplane is in flight, a retracted or semi-retracted position.

A still further object of the invention is to provide an aeroplane landing gear in which the entire shock absorbing structure, as well as a substantial portion of the landing gear framing, is completely enclosed within, and hence streamlined as a unit with the aeroplane fuselage or body.

Other objects and advantages of the invention will be hereinafter set forth.

In the drawings, wherein like reference characters denote like or corresponding parts throughout the several views, Fig. 1 is a side elevation of an aeroplane equipped with a landing gear of the character herein set forth;

Fig. 4 is a side elevation of the landing gear per se, the dotted lines indicating the relative movement of the front and rear landing devices;

Fig. 5 is a plan view of the structure illustrated in Fig. 4, and

Fig. 6 is a longitudinal vertical sectional view of one of the shock absorbing units.

Figure 1:
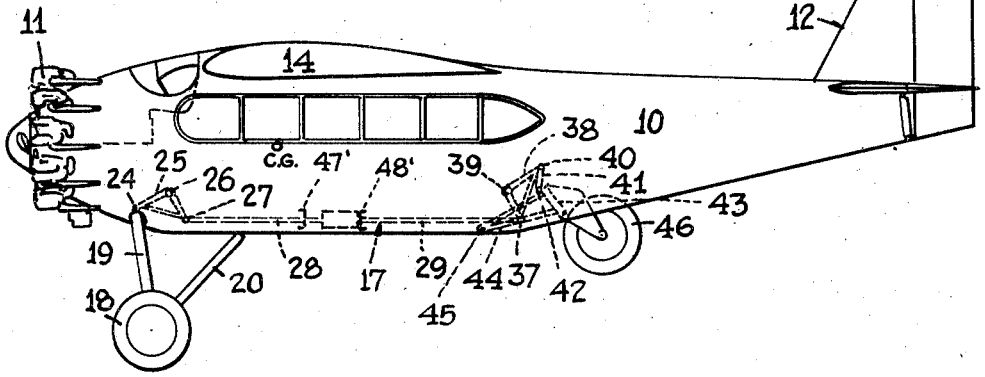
Figure 2:
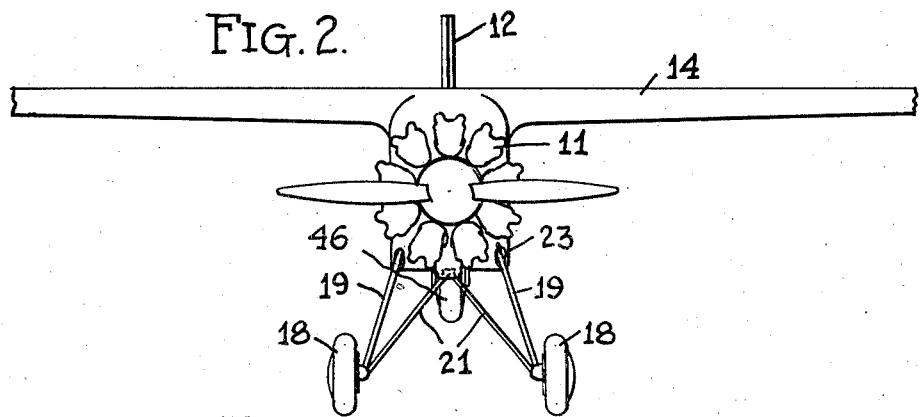
Fig. 2 is a front elevation of the aeroplane shown in Fig. 1.
Figure 3:
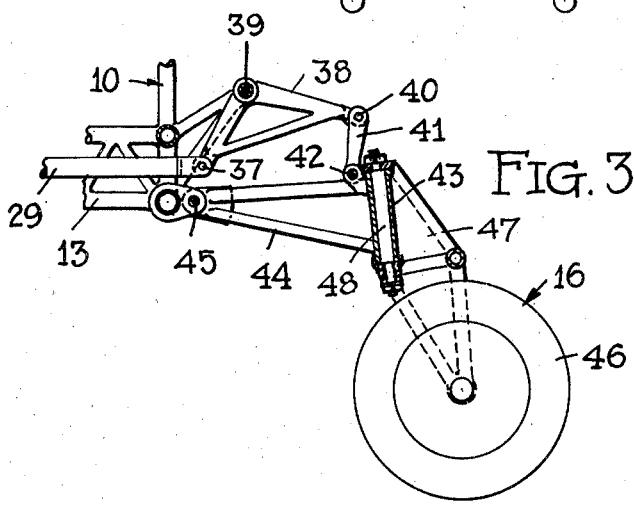
Fig. 3 is a longitudinal vertical sectional view of the framing or support for the rear landing device or wheel.

In the embodiment of the invention selected for illustration, an aeroplane of more or less conventional appearance is shown. The fuselage or body of the aeroplane is designated in its entirety as 10. At its forward end said body is provided with a propelling powerplant 11 and at its opposite end it is provided with the usual empennage 12. The skeleton of said body, as indicated in Fig. 4, throughout a substantial portion of its length, is reinforced along its underside, and to said reinforced portion 13 the landing and ground operating strains are carried. Intermediately of its ends said body 10 has fastened thereto the usual wings or supporting surfaces 14.

Unlike the conventional aeroplane landing gear, the landing gear herein described is adapted to support the aeroplane fuselage or body normally horizontal, i. e., on an "even keel" both while at rest and while the aeroplane is in operation. This is satisfactorily accomplished by the provision of three landing devices triangularly arranged (when viewed in plan) and disposed respectively two well in advance of and one well behind the transverse vertical plane of the center of gravity of the aeroplane. The center of gravity of the aeroplane is clearly indicated in Figs. 1 and 4. Said landing devices, designated respectively as 15—15 and 16, are each pivotally supported or hung from the underside of the fuselage and are interconnected (the two front and the one rear) by telescoping rods or tubes 17 which are adapted to slide back and forth as the loads on the front and rear landing devices vary.

The two front landing devices are preferably laterally spaced, one each at opposite sides of the longitudinal vertical plane of the fore and aft center line of the aeroplane. Each said device preferably comprises a wheel 18, a pair of upwardly diverging outer struts 19 and 20, and a single backwardly inclined inner strut 21. The struts 20 and 21, in each instance, (viewed from either the front or rear) also diverge upwardly and at their inner or upper ends are pivotally fastened as at 22 to the fuselage. At their outer or lower ends said struts 20 and 21, together with the third or forward struts 19 of each strut group, collectively support the axle struts (not shown) upon which the wheels 18 are mounted. Said wheels 18 are thus bodily movable both with respect to the fuselage 10 and with respect to each other about a common transverse axis passing thru the four points of attachment 22 of the rear struts 20 and 21.

The forward struts 19 of each strut group, instead of being pivotally fastened to the fuselage 10, are carried thru openings 23 formed in the fuselage cover, and at their inner or upper ends are pivotally fastened as at 24 to suitable bell cranks 25. The bell cranks 25 are, in each instance, completely enclosed within the fuselage and tho widely spaced, have a common axis of rotation. An adequately braced transverse fuselage frame member 26 is arranged to serve as a rigid bell crank support. The arms of each bell crank 25 extend off from said support 26 at an angle. To the forwardly extending arms of each bell crank, the struts 19 are fastened, whereas to the downwardly extending arms thereof the interconnections 17 aforesaid, are pivotally fastened as at 27. As said interconnections 17 (one for each strut group) are thus joined to the forward landing devices, any and all vertical or bodily movement of said landing devices incurred during ground operation is immediately transmitted thru said bell cranks to said interconnections.

The interconnections 17, one for each forward landing device 15, converge rearwardly and throughout their full length are completely enclosed within the aeroplane body. Each, as previously intimated, is telescopic in form and comprises a forward rod or tube section 28 and a rear rod or tube section 29. Said rod or tube sections, in each instance, engage one within the other and, as illustrated in Fig. 6, are yieldingly joined together at an intermediate point. The forward rod sections 28 have formed therein at said joint, two longitudinally extending diametrically opposed slots 30 within which are fitted suitable pins 31 fastened to the rear rod or tube sections 29. The rear rod or tube sections 29 are also provided with similarly formed slots 32 thru which pins 33 carried by the forward rod or tube sections 28 are passed; the pins and slots collectively acting as guides or stops for the telescoping tubes or rods. In addition to said pins 31 and 33 each telescoping rod or tube section 28 and 29 is provided with an outwardly extending annular abutment at or near its inner or telescoping end. These abutments (the one for each rod section 28 being designated as 34 and the one for each rod section 29 being designated as 35), four in number, and arranged in pairs, two for each joint, have disposed between them, i. e., the respective pairs, a plurality of rubber discs 36. Said discs 36, as the rod or tube sections tend to elongate, resist such elongation and jointly constitute the two shock absorbing units of the landing gear.

At their rear ends, the two telescopic interconnections 17 are pivotally fastened as at 37 to one arm of a rear bell crank 38. This bell crank 38, like the forward bell crank 25, is mounted for rotation within the body 10 on a transversely extending fuselage strut or frame member 39. At its opposite end said bell crank 38 is pivotally fastened as at 40 to a link 41 which is in turn pivotally fastened as at 42 to a sleeve 43 mounted at the outer end of a transverse rigid tho vertically movable triangulated frame 44. Said frame 44, at its forward end, is pivotally fastened as at 45 to the body 10 and is movable vertically about its pivot axis with and according to the movement of said bell crank 38.

The sleeve 43 of the frame 44 constitutes in effect a journal or bearing within which the rear landing device 16 is mounted. Said rear landing device 16 preferably comprises a wheel 46, a frame 47 and a shaft 48, the latter engaging in the sleeve 43 in much the same manner as the shaft of a castor wheel. Thus mounted, said wheel 46 is bodily vertically movable with the rear bell crank 38 and bodily laterally movable about an axis passing longitudinally thru said sleeve.

The rubber discs 36, in addition to yieldingly resisting elongation of the interconnections 17 extending between the front and rear landing devices 15 and 16, also function as shock absorbers when said landing devices are independently stressed. That said discs 36 may function under the circumstances last mentioned, two transversely extending abutments 47' and 48' are provided. These abutments 47' and 48' are preferably constructed as an integral part of the body or fuselage frame. Each said abutment has formed therein two openings 49. These openings, thru which the interconnections 17 pass, are so dimensioned that the shock absorbing units in moving back and forth from one to the other thereof, cannot enter therein or pass therethru, but are brought abruptly into bearing contact with one or the other of said abutments. With the shock absorbing units in bearing contact with the forward abutment 47', and the rear landing device in bearing contact with the ground, any and all shocks directed against the forward landing device may be completely absorbed. With the shock absorbing units in bearing contact with the rear abutment 48', all shocks directed against the rear landing device will be completely absorbed. To take care of rebound shocks or shocks occasioned thru the back and forth movement of the shock absorbing units, additional discs 50, arranged as indicated in Fig. 6, may be provided.

To reduce the head resistance or drag of the landing gear, the rear landing device instead of projecting well below the bottom of the fuselage, is withdrawn partially thereinto during flight. Such contraction of the rear landing device is in effect at least automatic. Due to a difference in weight, and to the interconnection between the landing gear devices, the rear device, which is lighter, will automatically retract immediately the machine leaves the ground.

The operation of the landing gear is as follows: With the machine at rest, all wheels bear solidly on the ground, each supporting a substantial portion of the total weight of the aeroplane. The fuselage or body 10, under such conditions, is substantially horizontal. To raise or retract the rear wheel, with said wheel still in contact with the ground, it is but necessary to depress the tail of the aeroplane in the ordinary way. In thus depressing the tail, the angle of incidence of the wings is increased and the take-off, after the usual preliminary run, effected. The difference in distance between the center of gravity and the ground line with the fuselage horizontal and with the fuselage inclined rearwardly, as when the rear landing device is retracted, is such that in the absence of a depressed tail, the fuselage will automatically seek a substantially horizontal position (see Fig. 4). In landing, should the front wheels come in contact with the ground first, they will, or either of them, due to their disposition far ahead of the center of gravity, prevent a nose over, and under impact yield vertically in an upward direction. The rear wheel, at the same time, due to the interconnections 17, will move outwardly or away from the fuselage until it too is in contact with the ground. With both front and rear wheels in contact with the ground, the wheel brakes (if wheel brakes are provided), may be firmly applied and the machine brought quickly to a standstill. During that period in the operation of the areoplane both before leaving the ground and after alighting, when both the front and rear wheels are in contact with the ground, the shock absorbing units will function to yieldingly resist elongation of the interconnections 17 and accordingly absorb all ground operating shocks. In the event of a tail-low landing, the rear wheel will yield independently of the front wheel or wheels since the shock absorbing units under such conditions are in bearing contact with the rear fixed abutment 48'.

The advantages of a landing gear thus characterized are that landings can be effected in a small field because of the possibility of using a maximum of braking force on the wheels without risking a nose over; that the fuselage or body of the aeroplane, while on the ground, is kept constantly in a horizontal position, thereby giving quicker acceleration in a take-off and a psychological effect on the passenger or passengers tending to instill a feeling of safety not now felt by the uninitiated; that a two-point landing is automatically and instantaneously safely converted into a three-point landing; that the ground reactions are transmitted as a force thru the center of gravity of the aeroplane, and landings accordingly made smoother; that the present dangers encountered in a high speed landing are to a large extent entirely eliminated; that the handling of the aeroplane, both in landing and in taking-off is identical with what is now the established practice; that taxying maneuvers require less motor power than with a landing gear using the conventional tail skid; that the simplicity of the arrangement will provide for a reduction in weight since but two shock absorbing units are required for the three wheels; that resistance, during flight, is less than heretofore on account of the partial concealment of the rear wheel within the fuselage and on account of the reduction in wheel size made possible by better weight distribution; that the objectionable "cloud of dust" by which a busy landing field is now recognized, and the ground drag of the conventional tail skid, are eliminated; and that landings, regardless of ground conditions are made safer, less uncomfortable and smoother than with the now almost universally used two wheel landing gear.

While I have described my invention in detail in its present preferred embodiment, it will be obvious to those skilled in the art after understanding my invention, that various changes and modifications may be made therein without departing from the spirit or scope thereof, I aim in the appended claims to cover all such modifications and changes.

What I claim is:

1. In an aeroplane landing gear, two relativey movable landing devices, said devices being disposed respectively one in advance of and the other to the rear of the transverse vertical plane of the center of gravity of the aeroplane, a sliding connection extending between said devices, means for restricting the extent to which said connection can be slid, and a shock absorber unit incorporated in and bodily movable with said sliding connection into and out of engagement with said restriction.

2. In an aeroplane landing gear, two relatively movable landing devices, said devices being disposed respectively one in advance of and the other to the rear of the transverse vertical plane of the center of gravity of the aeroplane, a sliding connection extending between said devices, a shock absorber unit incorporated in said sliding connection, and spaced abutments for limiting such sliding movement and against which said shock absorber unit is adapted to bear.

3. In an aeroplane landing gear, two relatively movable landing devices, said devices being disposed respectively one in advance of and the other to the rear of the transverse vertical plane of the center of gravity of the aeroplane, a telescopic connection extending between said devices, and a shock absorber unit incorporated in said telescopic connection for resisting the relative movement thereof and of said devices.

4. In an aeroplane landing gear, two relatively movable landing devices, said devices being disposed respectively one in advance of and the other to the rear of the transverse vertical plane of the center of gravity of the aeroplane, a two part connection extending between said devices, and a compression shock absorber unit engaging said two parts for yieldingly resisting the relative movement thereof and of said devices.

5. In an aeroplane landing gear, two relatively movable landing devices, said devices being disposed respectively one in advance of and the other to the rear of the transverse vertical plane of the center of gravity of the aeroplane, a sliding connection extending between said devices, a shock absorber unit incorporated in said sliding connection, and spaced abutments between which said shock absorber unit is adapted to slide back and forth.

6. In combination with an aeroplane body, a landing gear including two relatively movable landing devices disposed respectively one in advance of and the other to the rear of the transverse vertical plane of the center of gravity of the aeroplane, a connection extending between said devices and enclosed for the major part within said aeroplane body, and a shock absorber unit incorporated in said connection.

7. In combination with an aeroplane body, a landing gear including two relatively movable landing devices disposed respectively one in advance of and the other to the rear of the transverse vertical plane of the center of gravity of the aeroplane, and a yielding connection extending between said devices for resisting such relative movement, said connection for the major part being enclosed within said body.

8. In combination with an aeroplane body, a landing gear including two relatively movable landing devices disposed respectively one in advance of and the other to the rear of the transverse vertical plane of the center of gravity of the aeroplane, a sliding connection extending between said devices, a shock absorber unit incorporated in said sliding connection and enclosed within said body, and spaced abutments likewise enclosed within and fastened to said body between which said shock absorber unit is adapted to slide back and forth.

9. In an aeroplane landing gear, a vertically movable landing device mounted in advance of the transverse vertical plane of the center of gravity of the aeroplane, a comparatively light vertically movable landing device mounted behind said plane, and a connection extending between said devices by means of which the lighter device, due to the difference in weight therebetween, is normally maintained in a relatively higher position.

10. In an aeroplane landing gear, a comparatively heavy and a comparatively light landing device, said devices being disposed respectively, the heavier in advance of and the lighter to the rear of the transverse vertical plane of the center of gravity of the aeroplane, both said devices being interconnected and freely movable vertically relatively to each other whereby in the absence of either a static or an impact load, the heavier device, due to the difference in weight therebetween, is adapted to occupy a normal position lower than that of the lighter device.

11. In an aeroplane landing gear, two vertically movable landing devices, said devices being of unequal weight and being disposed respectively one in advance of and the other to the rear of the transverse vertical plane of the center of gravity of the aeroplane, said heavier device being adapted to occupy a normal position lower than said lighter device, and means extending between said devices for lowering the lighter device as the heavier device is raised under either a static or an impact load.

12. In an aeroplane landing gear, two vertically movable landing devices, said devices being of unequal weight and being disposed, the heavier in advance of and the lighter to the rear of the transverse vertical plane of the center of gravity of the aeroplane, and means extending between said devices for lowering the lighter device as the heavier device is raised under either a static or an impact load.

13. In combination with an aeroplane body, a landing gear including two relatively movable landing devices disposed respectively one in advance of and the other to the rear of the transverse vertical plane of the center of gravity of the aeroplane, and a connection extending between said devices for retracting one of said devices and extending the other of said devices simultaneously, the devices, in each instance, when retracted, being partly enclosed within said body.

14. In combination with an aeroplane body, a landing gear including two relatively movable landing devices disposed respectively one in advance of and the other to the rear of the transverse vertical plane of the center of gravity of the aeroplane, at least one of said landing devices being retractable to occupy a position partially enclosed within said body when retracted, and a connection extending between said devices for retracting one of said devices as the other of said devices is freed of its load.

In testimony whereof I hereunto affix my signature.

KNUT HENRICHSEN.